Aug. 23, 1927.
L. WILLIAMS
PRUNING IMPLEMENT
Original Filed June 9, 1926
1,640,168
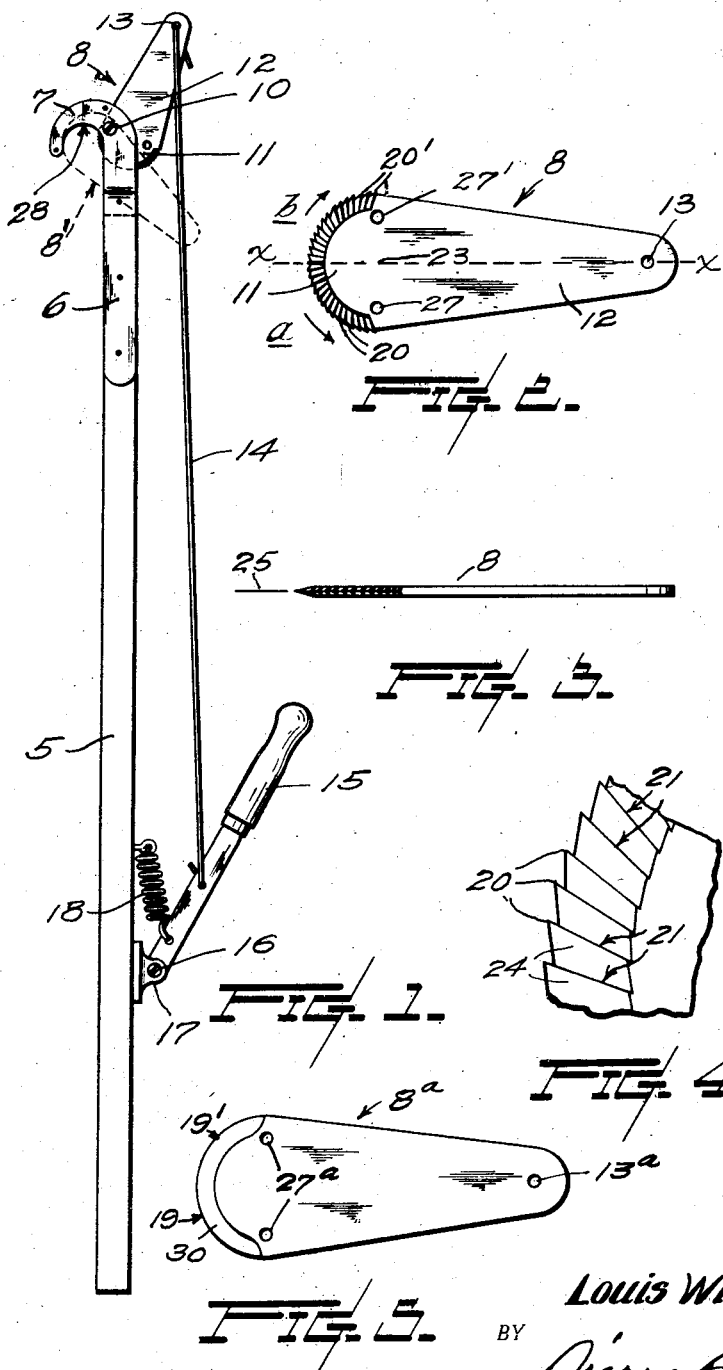
INVENTOR:
Louis Williams
BY
ATTORNEY.

Patented Aug. 23, 1927.

1,640,168

UNITED STATES PATENT OFFICE.

LOUIS WILLIAMS, OF SEATTLE, WASHINGTON.

PRUNING IMPLEMENT.

Application filed June 9, 1926, Serial No. 114,674. Renewed July 5, 1927.

This invention relates to improvements in tree pruning implements; and its object, generally, is to provide a device of this character with improved cutting means which will facilitate the operation of the implement with less labor and in a more convenient manner than hitherto.

A more specific object of the invention is to provide a pruning implement with a novel and improved form of cutting blade which will make a clean smooth faced cut without mashing or crushing the fibers of the wood being severed.

A further specific object is to provide a cutting blade which is formed and adapted to be used in reversed positions for the purpose of replacing a worn or dulled cutting portion of the blade with a sharp portion, thereby extending the use and increasing the efficiency of the blade and also the implement as a whole.

With these and other objects in view, the invention consists in the construction, adaptation and combination of features hereinafter described and claimed.

In the accompanying drawing,—

Figure 1 is a side elevation of a pruning implement including a cutting blade embodying the present invention, the blade being represented by full and dotted lines, respectively, in two positions. Fig. 2 is a side elevation of the cutting blade, shown detached; and Fig. 3 is an edge view of Fig. 2. Fig. 4 is a view similar to Fig. 2 showing a portion of the blade to an exaggerated scale. Fig. 5 is a view similar to Fig. 2 showing a modified form of cutting blade.

In said drawing, the reference numeral 5 represents a staff or pole, having rigidly secured to its opposite sides complementary plates, such as 6, constituting together what will be hereinafter designated as the head. The plate members of said head are each formed with a crook 7 and are spaced apart, in a known manner, to receive the cutting blade 8 therebetween.

Said blade is fulcrumed to the head by means of a pin or screw 10 secured in the head.

One arm as 11 of the blade is formed to provide the cutting element proper, the other arm, 12, serves as the operating element and is provided near its outer end with an aperture 13 for engagement with an end of an operating rod 14. The other end of this rod is connected to a lever handle 15 which is fulcrumed at 16 to an attachment 17 of the staff 5. A spring 18 connecting the staff with the handle serves to yieldably retain the latter and also the blade 8 in the inoperative positions in which they are illustrated by full lines in Fig. 1.

With the exception of the blade 8, all of the parts hereinabove referred to and the relative arrangement of the same are, or may be, of known or suitable construction.

The cutting blade 8 according to the present invention consists of a thin plate of a general configuration in side elevation substantially as shown in Fig. 2, the arm 11 being preferably of a semi-circular shape.

In the embodiment illustrated in Figs. 1 to 4, inclusive, the arcuate edge of the arm 11 is serrated to provide pluralities of teeth 20 and $20^1$ which are ground or otherwise formed to provide chisel faces 21 which are in planes disposed in angular relation with respect to lines projected radially of the center 23 of the arc of the teeth points to the points of the respective teeth.

In the duplex construction illustrated it is to be noted that I employ two sets or groups of teeth 20 and $20^1$ positioned at opposite sides of the longitudinal axis $x$—$x$ of the blade, so that one set of teeth 20 will cut when they are revolubly moved in the direction denoted by arrow $a$ (Fig. 2) and the other set of teeth $20^1$ will cut when they are revolved in the opposite direction as denoted by the arrow $b$.

Considering the chisel faces, 21, as the front faces of the respective teeth, the teeth are characterized by having their rear portions cut away to afford side faces 24, which slope from a plane 25 (Fig. 3) medial of the thickness of the blade and also rearwardly with regard to the respective front faces 21. The purpose of thus side-facing the teeth is twofold: first, to permit the bringing of the side edges of the faces 21 to sharp cutting edges and, secondly, to provide clearance for the teeth, and gullets to accommodate material removed by the teeth in the severing of wood in pruning.

By shaping the teeth, as explained, the teeth taper toward the medial plane 25 above mentioned, thereby causing the blade teeth to scoop, so to speak, a V-shaped cut from the work.

Where two sets of teeth are employed as in the duplex form shown in the views, the blade is provided with an aperture 27 suitably located to receive the fulcrum pin 10 for the set of teeth which are denoted by 20, and another aperture 27¹ suitable for locating the pin when the blade is applied to use the set of teeth which are denoted by 20¹. The fulcrum receiving apertures are disposed in proximity of the side edges of the blade arm 12 and eccentrically of the centers of the arcs of the respective sets of teeth whereby the movement of either set of teeth will be in a general direction diagonally of the work when the latter is engaged against the concave surface 28 of the crook 7 of the implement head.

In the modified construction shown in Fig. 5 the cutting blade 8ª is formed with edges 19 and 19¹ which are unprovided with teeth but is beveled as at 30, upon each side. This form of cutting blade performs its operation by a shearing cut and may be preferred for certain kinds of work. This modified construction is, like the first described form of blade, provided with pivot receiving holes 27ª and a hole 13ª in which the operating rod 14 is engageable.

The manner of using the pruning implement provided with my improved blade will be understood from Fig. 1 wherein the blade is shown by full lines 8 as being held in its inoperative position by means of the spring 18.

When the blade is thus disposed, the operator engages the crook 7 over a limb or branch of a tree, vine or other object which is to be pruned and thereupon, by means of the handle 15, pulls down the rod 14, resulting in the blade being drawn into its dotted line 8¹ position with a severing of the work by a drawing cut applied toward the crook.

The embodiments of the invention which I have selected for illustrative purposes, are what I term the duplex type, which is advantageous because it enables a blade to be quickly reversed in order to substitute one cutting edge or set of teeth for the other, with a corresponding extension in the use of a blade.

My improved pruning blade is easily sharpened by means of a file or other abrading means, it is efficient in operation, and requires relatively less power to effect its function.

What I claim, is,—

1. A cutting device for a pruning implement consisting of a blade having intermediate its length two laterally spaced apart pivot receiving holes, the blade at one side of a plane projected diametrically through the axes of both of said holes being of a serrated arcuate contour providing two sets of teeth, the front faces of the teeth of both sets being plane and inclined with respect to planes radial of the center of their arcuate disposition, the blade at the other side of said plane being adapted for engagement with means for operating the blade as a lever with respect to a pivot engaging in either of said holes.

2. A cutting device as defined in claim 1, in which the teeth converge from the opposite side surfaces of the blade to a plane medial of said side surfaces.

3. A cutting device as defined in claim 1, in which the side faces of the teeth are shaped to provide each of them with acute cutting edges and rear clearance to the respective teeth.

4. A cutting device for a pruning implement consisting of a blade having intermediate its length two laterally spaced apart pivot receiving holes, the blades at one side of a plane projected diametrically through the axes of both of said holes being of a serrated arcuate contour providing two sets of teeth, the blade at the other side of said plane being adapted for engagement with means for operating the blade as a lever with respect to a pivot engaging in either of said holes.

Signed at Seattle, Washington, this 14th day of May, 1926.

LOUIS WILLIAMS.